Jan. 15, 1957 A. G. MARCHANT 2,777,341
TREPANNING TOOL FOR CUTTING HOLES IN SHEET
METAL BODIES OR THE LIKE
Filed Nov. 13, 1953
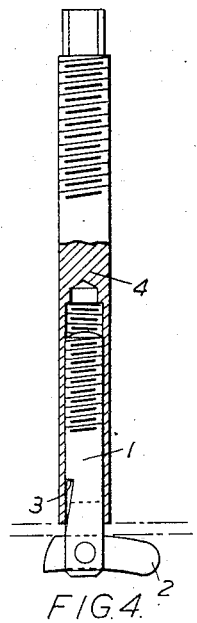
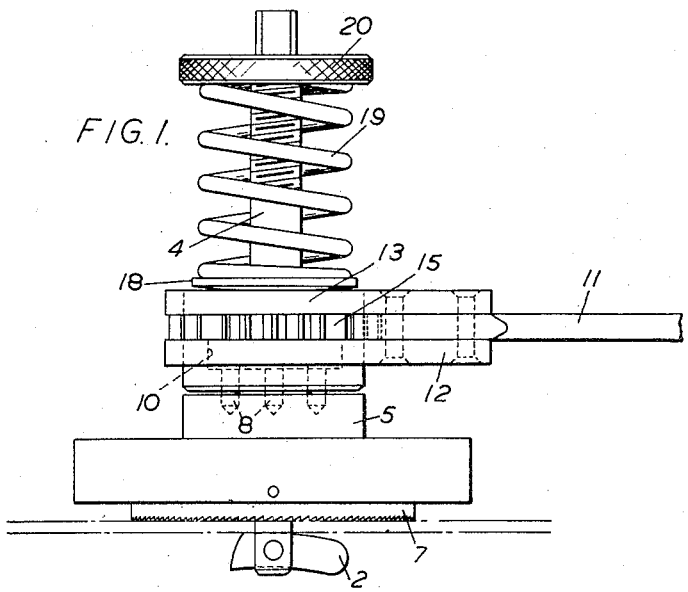
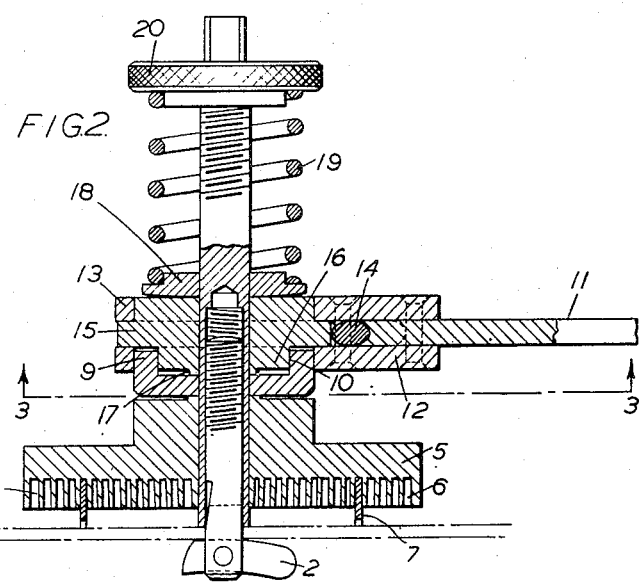
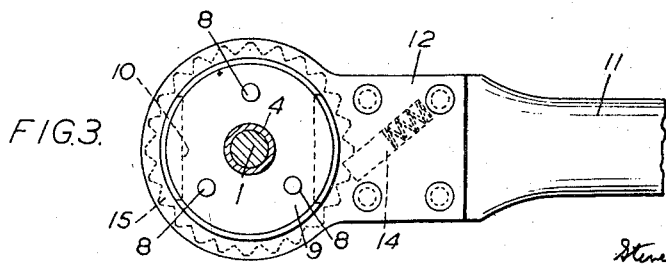
Inventor
Albert George Marchant
By
Stevens, Davis, Miller & Mosher
Attorneys

United States Patent Office 2,777,341
Patented Jan. 15, 1957

2,777,341

TREPANNING TOOL FOR CUTTING HOLES IN SHEET METAL BODIES OR THE LIKE

Albert George Marchant, Burgess Hill, England

Application November 13, 1953, Serial No. 392,008

Claims priority, application Great Britain November 14, 1952

2 Claims. (Cl. 77—69)

This invention is for improvements in or relating to a trepanning tool for cutting holes in sheet metal bodies or the like, and in particular to tanks, cisterns and like closed containers.

Great difficulty is sometimes experienced, when a hole has to be cut in a cistern wall in order to fix a pipe or the like owing to the fact that the wall in which the hole is to be cut is very often located in a very inaccessible position, for example in the angle of the roof of a house where the difficulties of cutting are such as to necessitate the cistern being disconnected and removed before the desired holes can be cut.

Part of the trouble encountered in such work is due to the fact that many of the trepanning tools hitherto proposed necessitate a nut being screwed upon that end of the supporting pillar of the tool which extends through a pilot hole into the interior of the cistern either to prevent the cut away portion of the wall of the cistern from falling into the cistern or to secure the said pillar rigidly to the wall of the cistern, or both. In either case it will be observed that a workman must have access to the inside of the tank or cistern to be able to screw the nut on to the pillar and, as is well known, this may well necessitate pipes being disconnected from the tank or cistern.

In the case of a trepanning tool hitherto proposed in which a gravity operated catch mounted upon the free end of the supporting pillar is capable of being fed through a pilot hole formed in the wall of a tank or cistern and thereafter straddle the said hole, no provision is made for rigidly securing the pillar to the wall of the tank or cistern independently of the tool-feeding means.

It is the object of the present invention to provide a trepanning tool capable of cutting holes in the surface of a closed container in which the pillar about which the cutting head rotates is capable of being mounted rigidly upon the surface to be cut independently of the cutting head and its associated parts which are subsequently mounted upon the pillar.

According to the present invention, there is provided a trepanning tool capable of cutting a hole in and removing the cut away portion from the wall of a completely enclosed container wherein a pillar adapted to form the support for a spring pressed cutting head rotatable about the axis of the pillar comprises a spindle tapped to receive a screw-threaded end of a bolt the free end of which carries a pivotally mounted gravity operated catch member which when disposed in axial alignment with the bolt enables the free end of the bolt to be inserted in a pilot hole formed in the wall of the container which is large enough to receive axially the free end of the bolt but too small to receive axially the spindle and which, when the bolt is disposed out of the perpendicular and with the catch member free to be operated by gravity, straddles the said pilot hole and enables the spindle to be tightened up on the bolt to clamp the surface adjacent the pilot hole firmly between the spindle and the catch member.

The invention will now be more particularly described with reference to the accompanying drawings, in which:

Figure 1 illustrates in elevation a ratchet operated trepanning tool constructed in accordance with the present invention;

Figure 2 illustrates partly in section the tool illustrated in Figure 1;

Figure 3 illustrates partly in section a view looking in the direction of the arrows 3—3 of Figure 2; and Figure 4 illustrates partly in section a side elevation, a pillar in the form of a combined bolt and spindle rigidly mounted upon a surface.

Referring to Figure 4 of the drawings, there is illustrated a pillar adapted to form the support for a spring pressed cutting head rotatable about the axis of the pillar. The pillar comprises a bolt 1 provided at one end thereof with a screw thread, and at the other end with a catch 2 pivotally mounted in such a manner that when the bolt is held in a perpendicular position the arms of the catch are arranged in alignment with the axis of the bolt and when held out of the perpendicular and with the catch 2 free to be moved by the force of gravity the arms of the catch are disposed transverse to the axis of the bolt. The bolt 1 is provided adjacent to the catch 2 with a notch 3 so arranged that if the end of the bolt carrying the catch is inserted through a pilot hole of the same dimension as the bolt, which has been previously drilled in one horizontally arranged wall of a tank or cistern, and the bolt is tilted out of the perpendicular by reason of the provision of the notch 3, the catch 2 will automatically pivot out of alignment with the longitudinal axis of the bolt 1 so that if the bolt is withdrawn the catch will engage with the inner surface of the wall of the tank and straddle the pilot hole. It will readily be appreciated that if the notch 3 were not provided in the shank of the bolt 1 so as to permit the bolt to be tilted out of the perpendicular it would be impossible to cause the gravity catch 2 to operate in the circumstances hereinbefore specified since by virtue of gravity the catch would remain in alignment with the axis of the bolt 1.

Referring to Figures 1, 2, 3 and 4 of the drawings, after the bolt 1 has been arranged in position with the gravity catch 2 straddling the hole in the tank as illustrated in Figures 1, 2 or 4, a spindle 4 which is tapped internally with a thread complementary to the thread on the bolt 1 and which is of larger diameter than the pilot hole formed in the wall of the container is screwed on to the bolt 1 and tightened until the surface adjacent to the pilot hole is clamped between the gravity catch 2 and the spindle, thereby ensuring that the pillar upon which the cutting head and its associated parts are mounted is perfectly rigid with respect to the surface in which the hole is to be cut.

Having mounted the pillar comprising the bolt 1 and the spindle 4 rigidly on the surface to be cut, an annular cutting head 5 is slipped over the spindle 4. The cutting head 5 preferably comprises on the underside thereof a series of concentric grooves or channels 6 (Figure 3) into any one of which may be fitted a saw 7. The saw 7 may vary in size from between three-quarters of an inch and any size in diameter and the grooves 6 are of complementary dimensions. The upper surface of the cutting head 5 is provided with three holes arranged to receive three pins 8 projecting from the underside of an adaptor 9. The adaptor 9 is constructed on the upper face thereof as a U-shaped transverse channel 10 provided with a central aperture arranged to receive the said pillar. The pins 8 and the channel 10 in the adaptor are provided for a purpose hereinafter to be specified.

A ratchet and pawl mechanism of conventional design and operation also provided with a suitable aperture is fed on to the said pillar. The said mechanism comprises a handle 11 arranged between two bearing plates 12 and 13 and a spring-loaded pawl 14 arranged to engage with the teeth of a ratchet wheel 15 rotatably mounted between the said plates 12 and 13. The ratchet wheel 15 is formed with a boss 16 (Figure 2) having two flat faces adapted to engage with the sides of the transverse channel 10 formed in the adaptor 9. An axial extension 17 (Figure 2) is provided on the boss 16 in order to reduce the surface contact between the adaptor 9 and the boss 16 of the ratchet wheel 15, the axial extension 17 in a preferred embodiment of the invention being 0.7 inch diameter and projecting a distance of 0.05 inch.

A washer 18 having a central aperture and formed with a flange upon the upper surface thereof is arranged with the underside thereof abutting against the upper surface of the ratchet wheel 15. The flange on the washer 18 provides a seating for a spring 19 the pressure of which is adjustable by means of a nut 20 which is adapted to be screwed on the screw-threaded upper end of the spindle 4.

In operation, the elements of the trepanning tool are mounted on the surface to be cut substantially in the order set out above. When the tool has been assembled, the teeth of the saw 7 may be caused to bite into the surface to be cut by adjustment of the nut 20. The ratchet and pawl mechanism is then operated by a reciprocating movement of the handle 11. The ratchet wheel 15 transmits the part rotational movements imparted by the handle 11 to the adaptor 9 by the engagement of the two flat faces of the boss 16 of the ratchet wheel 15 with the sides of the channel 10 of the adaptor 9. The adaptor 9 in turn transmits the said movements to the cutting head 5 through the medium of the pins 8 on the adaptor 9 and the holes complementary thereto in the cutting head 5.

It will be appreciated that different adaptors may be provided to meet the requirements of different forms of cutting head, thus instead of pins 8 other means of connecting the adaptor to the cutting head may be provided depending upon the head employed. For example, in an alternative construction, the cutting head may be provided with a centrally located frusto-conical extension which is adapted to form a friction drive with a centrally located frusto-conical aperture in the adaptor.

Thus, it will be seen that according to the present invention there is provided a trepanning tool in which the bolt 1 and the spindle 4 are so constructed that they can be mounted completely rigid with the surface in which a hole is to be cut and thus ensure that the cutting tool as a whole is firmly mounted with respect to the said surface in which the hole is to be cut. Further, the tool may be mounted upon the surface in which a hole is to be cut, whether the surface be the side of a closed tank or cistern or the top or bottom surface thereof without the necessity of moving the container from its set position.

What I claim as my invention and desire to secure by Letters Patent of the United States is:

1. A trepanning tool for cutting out and removing a portion of the wall of a completely closed hollow container, said wall having a small pilot hole formed therein; said tool comprising a bolt having a first end, a catch member, means provided on the first end of the bolt for pivotally attaching the catch member thereto so that the catch member can be disposed in axial alignment with the bolt and be passed through the pilot hole to the interior of the container, said means securing the catch member to the bolt so that the catch member, in its position of axial alignment, lies within the cross-sectional area of the bolt and so that the catch member is free to be moved by gravity, when the bolt is moved out of its position perpendicular to the wall, into a position transverse to the bolt for gripping the inner surface of the wall, said bolt having an externally threaded second end, a spindle having an inner end formed with an axial bore within which the bolt is socketed, said bore being internally threaded to engage the threaded second end of the bolt, said spindle being of a slightly greater external diameter than the bolt and being adapted to bear on its inner end on the outer surface of the wall in clamping relation with the catch member, said spindle having a smooth outer surface, a cutter rotatably circumposed on said surface, a ratchet means rotatably circumposed on the surface and connected to the cutter, said spindle having an outer externally threaded end portion, a nut threaded on said threaded portion, and spring means coiled on the spindle and bearing between the nut and the ratchet means to adjust the cutter and hold it tightly engaged with the surface of the wall.

2. A trepanning tool as claimed in claim 1, wherein said bolt has an axially extending notch formed therein adjacent the first end so as to permit the bolt to be moved out of a position perpendicular to the wall so that the catch member can be moved by gravity into its position straddling the hole.

References Cited in the file of this patent

UNITED STATES PATENTS

| | | |
|---|---|---|
| 687,809 | Wrigley | Dec. 3, 1901 |
| 831,152 | Gerwig | Sept. 18, 1906 |
| 1,241,543 | Murphy | Oct. 2, 1917 |
| 1,590,994 | Misener | June 29, 1926 |
| 1,846,400 | Macfarlane | Feb. 23, 1932 |